United States Patent
Fisher et al.

(10) Patent No.: US 9,694,291 B2
(45) Date of Patent: Jul. 4, 2017

(54) SYSTEM AND METHOD FOR INTERACTIVE ROLE-PLAY GAME SUPPORT

(71) Applicant: LEGACY GAME SYSTEM LLC, Asheville, NC (US)

(72) Inventors: Sidney F. Fisher, Asheville, NC (US); Ford M. Ivey, Asheville, NC (US); Brian T. McGlauflin, Pasadena, CA (US); Matthew Graham, Raleigh, NC (US); Vipresh Jain, Cary, NC (US)

(73) Assignee: LEGACY GAME SYSTEMS LLC, Asheville, NC (US)

( * ) Notice: Subject to any disclaimer, the term of this patent is extended or adjusted under 35 U.S.C. 154(b) by 124 days.

(21) Appl. No.: 14/456,500

(22) Filed: Aug. 11, 2014

(65) Prior Publication Data

US 2015/0045123 A1    Feb. 12, 2015

Related U.S. Application Data

(60) Provisional application No. 61/864,063, filed on Aug. 9, 2013.

(51) Int. Cl.
| | |
|---|---|
| A63F 13/86 | (2014.01) |
| A63F 13/216 | (2014.01) |
| A63F 13/34 | (2014.01) |
| A63F 13/327 | (2014.01) |
| A63F 13/352 | (2014.01) |
| A63F 13/49 | (2014.01) |

(52) U.S. Cl.
CPC ............ *A63F 13/86* (2014.09); *A63F 13/216* (2014.09); *A63F 13/327* (2014.09); *A63F 13/34* (2014.09); *A63F 13/352* (2014.09); *A63F 13/49* (2014.09); *A63F 2300/575* (2013.01)

(58) Field of Classification Search
CPC .......... A63F 13/58; A63F 13/31; A63F 13/86; A63F 13/34; A63F 13/216; A63F 13/327; A63F 13/352
USPC ..................................... 463/42, 43
See application file for complete search history.

(56) References Cited

U.S. PATENT DOCUMENTS

| | | | |
|---|---|---|---|
| 7,435,179 B1 * | 10/2008 | Ford ....................... | A63F 13/12 434/11 |
| 7,922,586 B2 * | 4/2011 | Heckendorf et al. ........... | 463/42 |
| 7,946,919 B2 * | 5/2011 | Piccionelli ............. | A63F 13/12 463/1 |
| 8,550,916 B2 | 10/2013 | Raynal | |
| 8,702,515 B2 | 4/2014 | Weston et al. | |
| 8,721,460 B2 | 5/2014 | Rosenblum | |
| 2002/0111201 A1 * | 8/2002 | Lang ................................ | 463/2 |
| 2003/0224855 A1 * | 12/2003 | Cunningham .......... | A63F 13/10 463/41 |
| 2005/0049022 A1 * | 3/2005 | Mullen ................... | A63F 13/12 463/1 |
| 2007/0167224 A1 | 7/2007 | Sprogis | |

(Continued)

*Primary Examiner* — David L Lewis
*Assistant Examiner* — Shauna-Kay Hall
(74) *Attorney, Agent, or Firm* — Maier & Maier, PLLC

(57) ABSTRACT

A system and method for interactive game support may be provided. A player may have a mobile device configured to run a game support application. The game support application may maintain game and player attributes and monitor interactions with game devices. In some embodiments, a command-control center server may be communicatively coupled with the at least one mobile device or game device so as to facilitate game management.

18 Claims, 5 Drawing Sheets

(56) References Cited

U.S. PATENT DOCUMENTS

| | | |
|---|---|---|
| 2008/0220693 A1 | 9/2008 | Cuisinier |
| 2009/0011832 A1* | 1/2009 | Rofougaran ...... H04M 1/72544 |
| | | 463/41 |
| 2009/0017913 A1* | 1/2009 | Bell et al. ...................... 463/40 |
| 2011/0312418 A1 | 12/2011 | Page |
| 2012/0295678 A1* | 11/2012 | Kreiner .................... A63F 9/24 |
| | | 463/6 |
| 2013/0072308 A1* | 3/2013 | Peck ...................... A63F 13/12 |
| | | 463/42 |

* cited by examiner

SYSTEM AND METHOD FOR INTERACTIVE ROLE-PLAY GAME SUPPORT

RELATED APPLICATIONS

This application claims priority to U.S. Provisional Application No. 61/864,063, filed Aug. 9, 2013, the contents of which are herein incorporated by reference.

BACKGROUND

The present disclosure relates generally to the field of role-play simulation, and more specifically to the field of live-action role-play.

Live-action role-playing games, already popular, have become more prevalent with the advancement and widespread accessibility of mobile computing. Mobile computing devices now make it easier for players to connect and interact with one another as well as game servers. Many role-play games, however, require specialized equipment for each game and do not allow for simultaneous customization or accurate tracking of all attributes which players in a game are assigned (for instance health levels, types and number of weapons, ammunition, and the like). Live-action role-play games often rely on a simplified laser gun and tag system.

Furthermore, current live-action role-playing games often operate on the honor system requiring players to keep track of their character's attributes and correctly track interaction with other players in the game and the respective consequences.

SUMMARY

In one exemplary embodiment, a system for interactive game support may be provided. The system may include at least one game device communicatively coupled to at least one player-associated mobile device. The at least one player-associated mobile device may be configured to run a game support application thereon. The game support application may maintain player attribute data and gameplay data. The system may further include at least one command-control center server, which may be communicatively coupled to at least one mobile device or at least one game device.

In another exemplary embodiment, a method of supporting a game may be provided. The method may include providing at least one mobile device associated with a player. A game support application may be run on the mobile device. Gameplay settings may be established and a game may be hosted. At least one player may be allowed join the game. Next, a player's attributes may be determined and at least one game device may be provided. Interactions among game devices and mobile devices may be monitored, and gameplay data may be updated based on monitored interactions.

BRIEF DESCRIPTION OF THE FIGURES

Advantages of embodiments of the present invention will be apparent from the following detailed description of the exemplary embodiments. The following detailed description should be considered in conjunction with the accompanying figures.

Exemplary

Exemplary

Exemplary

Exemplary

Exemplary

Exemplary

Exemplary

Exemplary

Exemplary

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
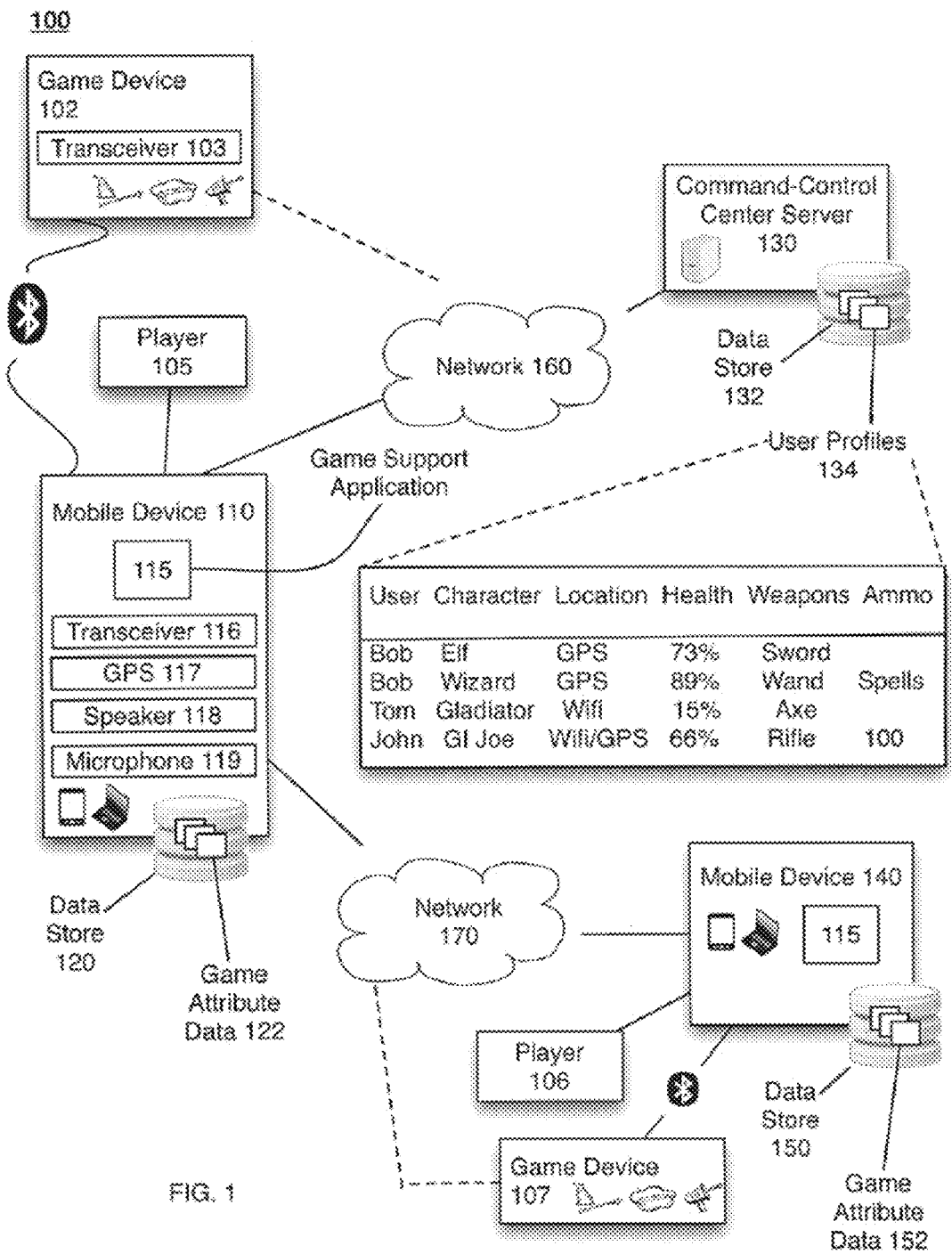
FIG. 1 shows a schematic diagram of a system for interactive game support.

According to at least one exemplary embodiment, a system for interactive role play game support may be disclosed. Referring to FIG. 1, a schematic diagram of an exemplary system for interactive game support may be provided. System 100 can include one or more players 105, 106, one or more game devices 102 and 107, a mobile device 110 and 140 with a game support application 115 running on mobile device 110, 140, one or more networks 160 and 170, and one or more command control servers 130, and, if more than one command-control server is used, the command-control servers can in one embodiment be connected by one or more networks.

In one embodiment, players 105 and 106 can utilize mobile devices 110 and 140 respectively to interact with one another and a command control center server 130 via network 160 and/or network 170 to establish and participate in a live interactive role-playing game managed by game support application 115. In another embodiment, players 105 and 106 can utilize game support application 115 on their respective mobile devices 110, 140 to create and play a fully customized or pre-defined interactive role playing game without having to connect to command-control center server 130. In this embodiment, players can utilize game support application 115, to, for example, define the playing field, set up player or character profiles, utilize previously established player or character profiles, track player specific and general game attribute data 122 and the like.

Player 105, 106 can be an individual user of the system, part of a team of game players, and the like. Game device 102 and 107 can be a variety of devices designed to facilitate live-action role playing games replicating weapons, armor, or the like, such as a laser gun, a wand, specialized interactive glasses, gloves, rings, braces, swords, etc. Game device 102, 107 may be configured to recognize interactions with other game devices. Game device interactions may include contact sensor interaction, laser and sensor interactions, and other forms of interactions as would be understood by a person having ordinary skill in the art. Game device 102 and 107 can include a transceiver 103 to interact with mobile device 110 and 140 for utilization of the disclosed game support system. Transceiver 103 can also be in the form of a separate receiver and transmitter and allow for connectivity via various technologies, including but not limited to Bluetooth, Ethernet, wifi, etc., as would be understood by a person having ordinary skill in the art. In some exemplary embodiments, game device 102, 107 can further include a transceiver, a GPS, a speaker, a microphone, and may additionally be equipped with game support software.

Mobile device 110, 140 can be, for example, a mobile phone (such as an iPhone, Android smartphone, Windows based smartphone, etc.), tablet and the like. Alternatively, mobile device may be configured specifically for live action role play. Mobile device 110, 140 can include game support application 115, transceiver 116, GPS 117, speaker 118, and microphone 119. Game support application 115 may be a software application designed to operate on a mobile device 110, 140. Game support application 115 can provide for various interactive game rules, settings, and enforcement. In one embodiment, game support application 115 can, with or without communication with a central command-control center server 130, track and push settings and attributes based on specialized game rules to game device 102, 107. Settings and attributes for interactive games can include items such as damage per round, number of rounds, rate of fire, automatic or semi-automatic fire, military simulation, specialized sounds like science fiction sounds, magic spells, player health (which could be tracked based on a player's character and the type of weapon or device used against the player for each attack), armor level, healing abilities, muzzle flash and the like. In some embodiments, game device attributes may be maintained through the game device itself, such that multiple players may use the same game device 102, 107. This may allow a player to pick up a game device 102, 107 from an expired player.

It should be noted that users can acquire these features and attributes in one embodiment through pre-sets done by a command-control system or within the game support application by multiple players when no command-control server is utilized. In another embodiment, users can acquire attributes through game interaction such as gaining player experience levels, picking up new devices, trading with other players or a game master, bartering for or selling devices and the like. Attributes can be game or event specific or can be carried over between game types and/or event events when allowed.

Mobile device 110, 140 can also include GPS 117 to facilitate defining bounds of a playing field via application 115 or ensuring enforcement of game specific rules such as remaining within pre-defined bounds of a playing field. GPS 117 may also be utilized to track player movement and actions within the defined bounds of the playing field for the interactive game. In some embodiments, GPS 117 may be used via application 115 to find nearby games, find a specific playing field, or to make a player eligible to join a game. GPS 117 may also be used by a player to identify a current location or points of interest on a playing field. For example, GPS 117 may be able to identify a player's current location, teammate locations, accessory locations, a home base, or those of an enemy. As shown in exemplary FIG. 2, a map view of a playing field may be displayed through a command-control center server 130 or game support application 115. The map view may be available during a game or to recap a game. Speakers 118 can be a set of one or more speakers, which may produce sound within an environment external to a user and/or may be implemented within headphones and/or headgear specific to a user. In an exemplary configuration, the speakers 264 can include noise cancelation abilities. In another exemplary configuration, the speakers 264 can be used to create a closed audio environment, enhancing player immersion in the interactive game environment. In yet further exemplary configurations, the speakers can be integrated into game device 102 and 107 instead of or in addition to speakers in mobile device 110, 140.

Microphone 119 can be utilized in conjunction with speaker 118 to establish walkie-talkie functionality or facilitate communications between players 105, 106 and/or players 105, 106 and a game master. These communications can be on separate frequencies to facilitate team formation, cohesion, morale, and the like in interactive games. In another embodiment, microphone 119 can work in conjunction with, for example, speech processing software to allow players 105, 106 to speak commands for game devices 102, 107 that can be interpreted and applied to players' game attribute data measures. For example, a player 105, 106 could hold down an activate button (typically utilized to signal voice input to devices) on his or her wand game device 102, 107 or mobile device 110, 140 and speak the name of a spell to utilize against a player opponent. Similarly to speaker 118, microphone 119 could be embodied in game device 102, 107 in addition to or instead of mobile device 110, 140.

Mobile device 110, 140 can also include data store 120, 150 which can maintain game attribute data 122, 152. Game attribute data 122, 152 can be separated by game or character or a combination thereof. Mobile device 110, 140's data store 120, 150 can also maintain multiple profiles within game attribute data 122, 152 for multiple players utilizing the devices at separate times. As previously mentioned, mobile device 110, 140 can communicate with command-control server 130 via network 160 and/or network 170 to allow players 102, 106 to take part in a command-control center server hosted interactive role playing game. The game devices 102, 107, as well as mobile devices 110, 140 can communicate with each other and/or the command-control server 130 in real time to provide statistics such as which player is shooting or putting a spell on another player, the exact effects of the weapon or spell used on the specific player by character type and the like. It should be noted that game support application 115 can recognize that various types of weapons can inflict various types and levels of damage on different players (and can be further customized by player type, for example recognizing different effects on an alien versus human character and the like).

Pursuant to the above description, an exemplary embodiment may include a wand as a game device 102, 107. The wand may be configured to interact with other game devices 102, 107 such as other wands or receiving units disposed on a fellow player. An exemplary receiving unit may be configured as clothing, armor, another wand, or the like. The wand may interact with receiving units by transmitting an infrared beam, which may carry specific codes to communicate desired effects. For example, the signal may communicate to the receiving unit of a fellow player that their health has been damaged or that they have been frozen in place, among other interactions as would be understood by a person having ordinary skill in the art. The receiving units or game support application 115 may be configured to apply certain protections based on character attributes or preferences. This may include ignoring damage instruction from received signals. Mobile devices running game support application 115 and communicating with receiving units may project responses based on device interactions. Responses may include audible or visual responses, which may describe the effects of an interaction, such as a spell transmitted by a wand. This may indicate to players how to react to various interactions. In some embodiments, a player's character may expire based on interactions, which may trigger the player's devices 102, 107 to prohibit future interactions.

Figures 4A, 4B:
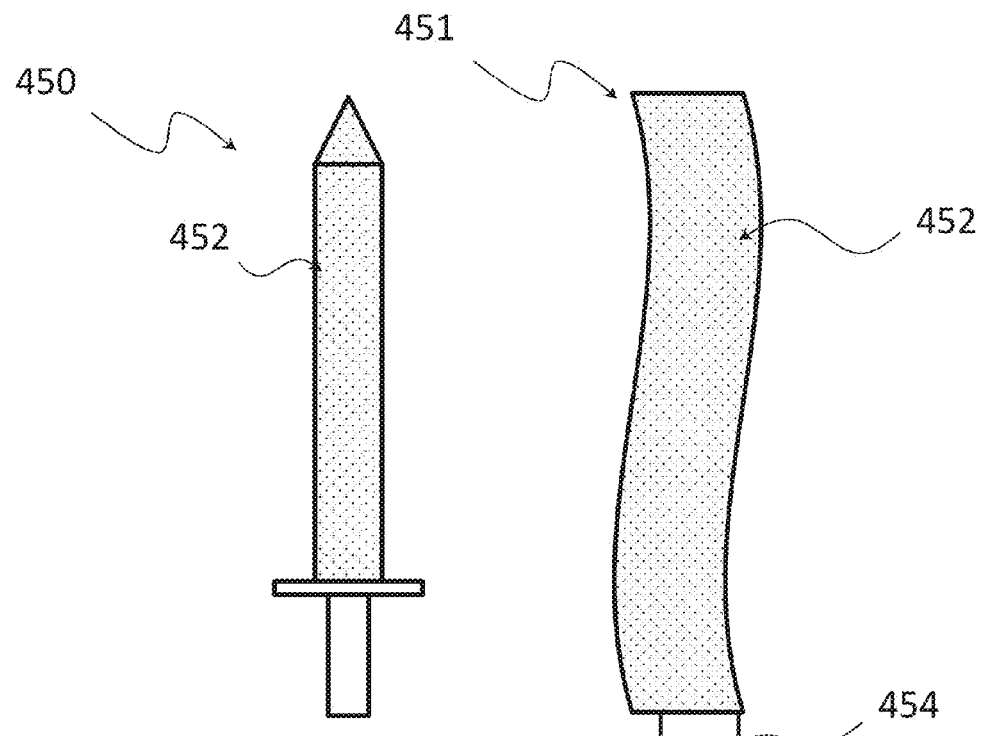
FIG. 4A shows a game device.
FIG. 4B shows the surface of a game device.

In other embodiments, game devices 450 may incorporate the use of fiber optic switches to monitor interactions, as shown in exemplary FIGS. 4A-4B. For example, a sword or similar device 450 may include fiber optics 452 disposed along an exterior surface. The fiber optics may include a fiber optic filament. Players or other game devices 451 may be wrapped in fiber optic cloth or other filament 452. During gameplay, the fiber optic filaments 452 of one game device 450 may interact with the filament of a second game device 451. In an exemplary interaction, a fiber optic cloth or filament may pick up and focus leaked signals from a fiber optic filament disposed on an interacting device, such as a sword. A sensor or detector 454 in communication with the cloth or other filament may receive the leaked signal. In an exemplary embodiment, interaction data may be communicated to a mobile device 110, 140, similar to embodiments utilizing infrared signals.

Figure 4C:
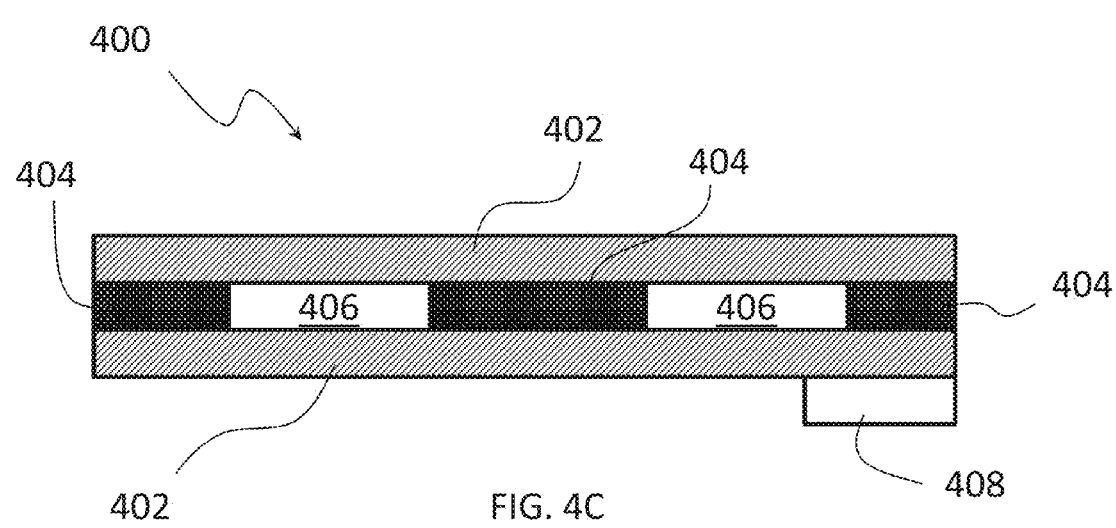
FIG. 4C shows a cross-sectional view of a portion of the surface of a game device.

In yet further embodiments, game devices 400 may incorporate the use of conductive fabrics 402 to monitor interactions, as shown in exemplary FIG. 4C. In one such embodiment, a game device 400 may include layers of conductive fabric 402 separated by an insulating material 404, such that the conductive fabric layers 402 do not interact. Gaps or holes 406 may be disposed within the insulating material, such that when pressure is applied to the fabric, the conductive layers 402 may come in contact with one another through the gaps or holes 406. This may complete a circuit, indicating to a connected monitoring device 408 that the fabric has been contacted. This data may then be transmitted by a connected transmitter or transceiver to a mobile device 110, 140. A game support application 115 may utilize the data. Therefore, if a game device 400 having the described layers of conductive fabric 402 were to strike an object or be struck, the event may be recognized and communicated.

Even further, in some exemplary embodiments, layer of conductive fabric 402 may cover the surface of game devices 400, such as weapons, armor, clothing, or the like. When the conductive fabric of one game device 400 such as a weapon contacts the conductive fabric of another game device 400, such as armor, clothing, or the like, a circuit may be completed, indicating to a connected monitoring device 408 that an interaction had occurred. Data from the monitoring device 408 may then be transmitted by a connected transmitter or transceiver to a mobile device 110, 140. The result of the interaction may be determined and implemented by a game support application 115 on the mobile device 110, 140.

Figure 2:
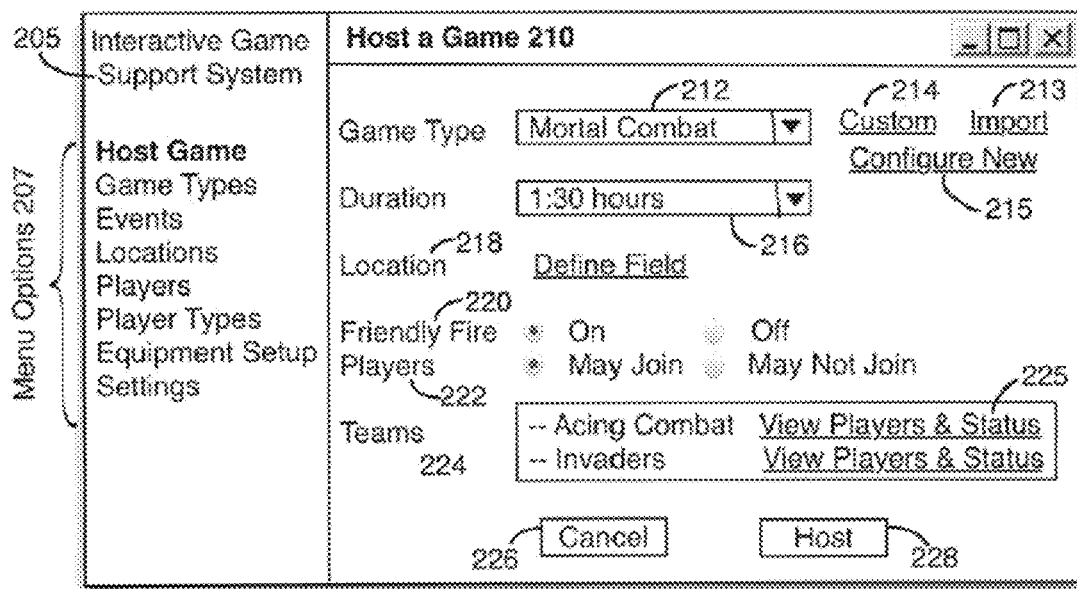
FIG. 2 shows a set of interfaces for a command-control server.
Figure 2:
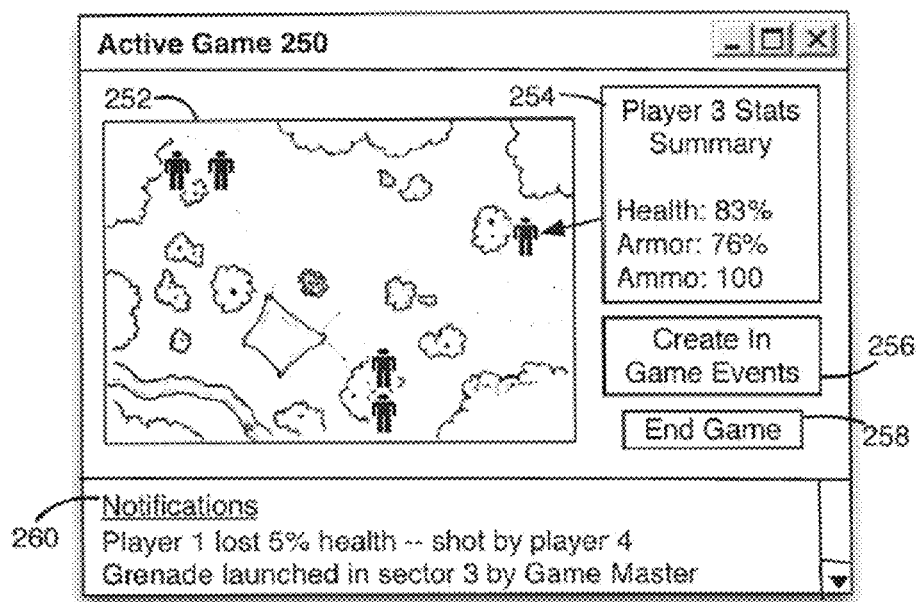

As illustrated in FIG. 2, command control center server 130 can control all aspects of a hosted game, including but not limited to, defining a playing field, allowing players to sign in or out of a hosted game, be assigned equipment, and the like. Command-control center server 130 can also include a data store 132 to maintain user profiles 134 as illustrated in FIG. 1. It should be noted that in one embodiment, the present disclosure can allow for character management. For instance, each player 105, 106 can create a character profile via a website or game support application 115—when they check into a game, using a mobile device 110, 140 to "check them in", the players 105, 106 may be assigned game devices 102, 107 (weapons, protection devices, and accessories), which have been configured for that specific player. Statistics and game results may be stored and shared among mobile devices through game support application 115. When connected to a command-control center server 130 via a network, such as the internet, statistics and game results may be uploaded to the command-control center server 130 and players 105, 106 can then view these statistics, manage their characters, spend earned points, etc. via a webpage. Communication between mobile devices 110, 140 and a command-control center server 130 may be maintained during a game, or data may be uploaded when communication is re-established after a game. In an exemplary embodiment, user interaction with a command-control center server may be facilitated through a webpage. This also means that game plot may use a point-earnings system, where points can be collected, traded and spent on weapons, armor, accessories or ammo upgrades, etc.—each player's game device 102, 107 can be programmed with this character profile. The point-earnings system may operate as a currency among games managed by the game system, or within specific game types. In some exemplary embodiments, the point system may be managed through the game support application on a mobile device.

Network 160, 170 can include any hardware/software/and firmware necessary to convey data encoded within carrier waves. Data can be contained within analog or digital signals and conveyed through data or voice channels. Network 160, 170 can include network equipment and all network or local components required for data to be exchanged between computing device components. Data stores 120, 132, 150 can be a physical or virtual storage space configured to store digital information. Data stores 120, 132, 150 can be in the form of, for example, an optical disk, a semiconductor memory, or any other recording medium as would be understood by a person having ordinary skill in the art.

Each of the devices or components 102, 107, 110, 120, 130, 140, 150 may include hardware (e.g., transceiver 116, GPS 117, speaker 118, microphone 119) as well as zero or more computer program products (e.g., game support application 115). Computer program products can include software and/or firmware. Software, firmware, and/or data used by the executing versions of the same can be stored within one or more tangible storage medium (e.g., data store 120, 132, 150). The embodiments, devices, and components of FIG. 1 are not intended to be exhaustive and other arrangements, for devices and components of FIG. 1 are contemplated. That is, derivatives and alternatives of the hardware/software detailed in FIG. 1 that function to serve substantially equivalent or similar functions are contemplated and are to be considered within the scope of the disclosure.

FIG. 2 is a depiction 200 of a set of web-interfaces 210, 250 that illustrate an exemplary command-control server perspective of a system for interactive role-play support in accordance with an embodiment of the inventive arrangements disclosed herein. The GUIs 210, 250 illustrate examples of a potential command-center server interactive game support system 205. In one embodiment, a game master can maintain a full control over the web component of interactive game support system 205. In another embodiment, players in a game may assign their own game master to set up and host a game pursuant to, for example, GUI 210 or preside over a game as in for example GUI 250.

GUI 210 includes main menu options 207 available to a game master within a central command-control center server or a web version of game support system designed to be accessible by players and interact with game support application 115. Main menu options can include hosting a game, game types, events, locations, players, player types, equipment setup, setting, and the like.

Selecting a "game types" link from a menu 207 may present a game master or player with a list of game types with options to edit predefined game types, add new game types and the like. An events link may present the game master or player with a list of upcoming or past events with options to view past game data, participants (teams and individual players), options to create a new event or edit future event details and invitees, and the like. The settings option can allow for username and password edits, providing information regarding a WS server or posting and the like. A "player types" option on the menu sidebar options 207 can, for example, list player types with player statistics and preset attribute levels, can allow presets to be edited for individual implementations of player types or for all future uses of a specified player type preset.

Host a game GUI 210 can provide a number of selections for configuring and hosting an interactive role playing game and can be available via a website, via the game support application 115 or be managed by an external game master (an individual or robot) through a command-control center server. Options can include defining a game type 212, importing a game type 213, creating a custom game type 214, configuring a new game type 215, and the like. Additionally, the duration 216 of the hosted game, and a location 218 for the hosted game can be set via the host a game GUI 210. Location 218 may, in at least one exemplary embodiment, be defined with GPS points by a mobile device 110, 140. A user may set points by walking to corners and selecting a boundary input control, or manually inputting coordinates as playing field edges. In another embodiment an address field may be used for navigation of a determined location.

Other options such as friendly fire settings 220 (whether friendly fire will result in a player health decline or not), player permissions to join 222 (whether players have to be invited versus voluntarily join) and the like are also contemplated. Moreover GUI 210 can show a list of teams 224, including a respective team's players and player status or details 225. Players 225 can include information such as whether players are checked in to a game, whether players have been assigned equipment and which equipment they are using, players' names, basic user information, statistics and attributes of players, and the like. GUI 210 can also include a cancel button 226 as well as a host button 228 to host a game.

Active Game GUI 250 can present an overview of a currently ongoing interactive role playing game. Active game GUI 250 can include an interactive map 252 to track players in real time and can allow for a player details/statistics view 254 summary. Additionally, GUI 250 can include buttons to create in game events 256 such as launching a grenade, air attack, fireball, and the like as well as a button to end the game 258. Real time notifications 260 can also be included in GUI 250.

Figure 3A:
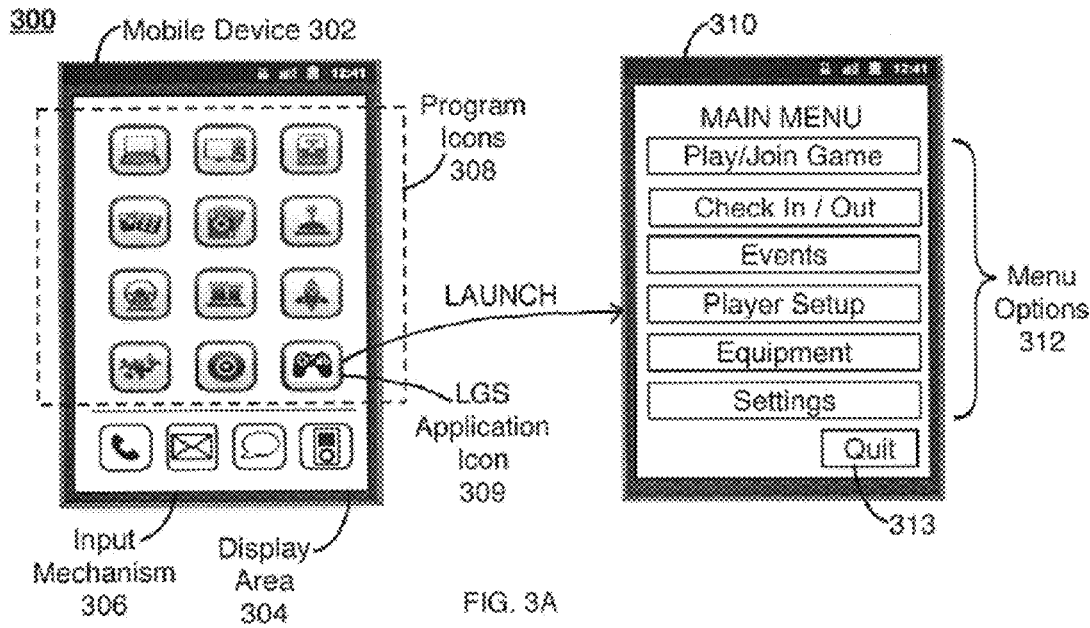
FIG. 3A shows a mobile graphical user interface (GUI) depicting a game support application.

FIGS. 3A to 3D show exemplary embodiments of mobile graphical user interfaces (GUIs). FIG. 3A shows GUI depictions 300 for an implementation of the current disclosure. It should be noted that the GUI depictions can have different implementations, including variations among mobile platforms (Android, iOS, Windows Mobile, etc.). In collection 300, a mobile device 302 can allow access to the game support system application via its application icon 309. The mobile device can include a display area 304 and an input mechanism 306, which can be one and the same with the display area 304 being used for the input mechanism 306. In another embodiment, input mechanism 306 can be in the form of a keyboard, mouse, touch screen, joystick, other pointer devices, and the like.

The game support application may be presented in addition to other program icons 308 on a mobile device. Selection of the game support application icon 309 may result in the launch of the interactive game support application 309 and display of a main menu 310. Main menu 310 can present the user with high level menu options 312, for example, options to play/join a game, check in or out of a game based on specific servers to connect to, view events and/or RSVP, player setup options, equipment information and settings menus for user id, password settings and the like. Available options may be unique for each user. A quit button 313 may allow the user to exit the application.

Figure 3B:
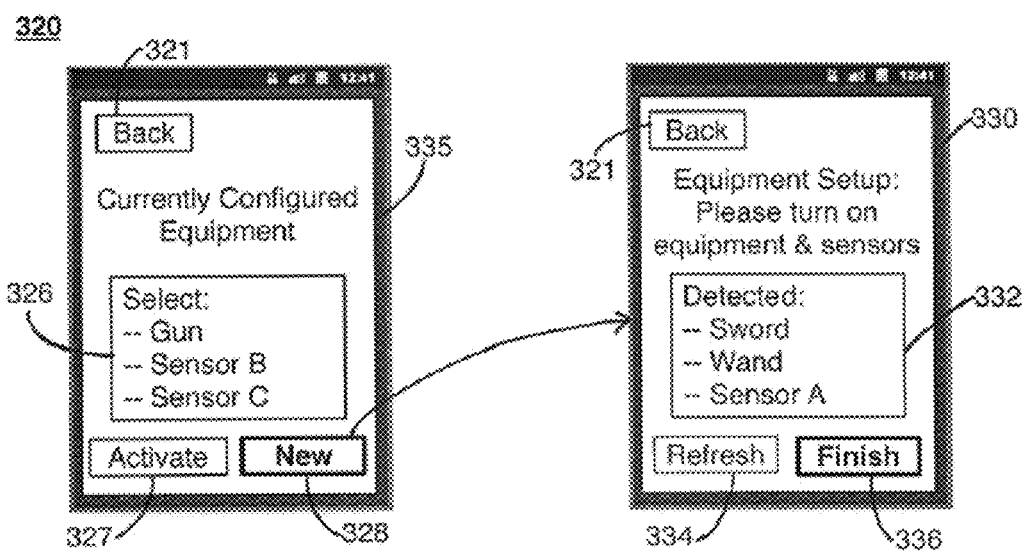
FIG. 3B shows a mobile graphical user interface (GUI) depicting a game support application.

FIG. 3B presents exemplary embodiments of GUIs 320 for equipment (i.e., game device 102, 107) configuration within the mobile device application 115. A back button 321 may allow a user to return to main menu 310 or a previous screen in any submenu configurations. Configured equipment menu 335 can include an equipment selection field 326 that can allow a user to select previously configured equipment to activate 327 for participation in a current game. Alternatively a user may select to configure new equipment via a control 328. Selection of the new equipment control 328 may result in the presentation of a new equipment setup GUI 330, wherein back button 321 may return the user to the currently configured equipment menu 335.

Exemplary equipment setup GUI 330 may include a detection window 332 that can display any captured equipment within range and allow a user to select one or more devices to activate via the finish button 336. In one embodiment a refresh button 334 may restart the detection of new equipment within a device range. Game support application 309 may launch a subsequent GUI with different finish options such as shooting a target such that both the gun and target are configured or pressing a button on the equipment for activation, and the like. In another embodiment, game support application could allow a user to manually key in equipment ID numbers, or scan an equipment barcode, etc. to activate equipment.

Figure 3C:
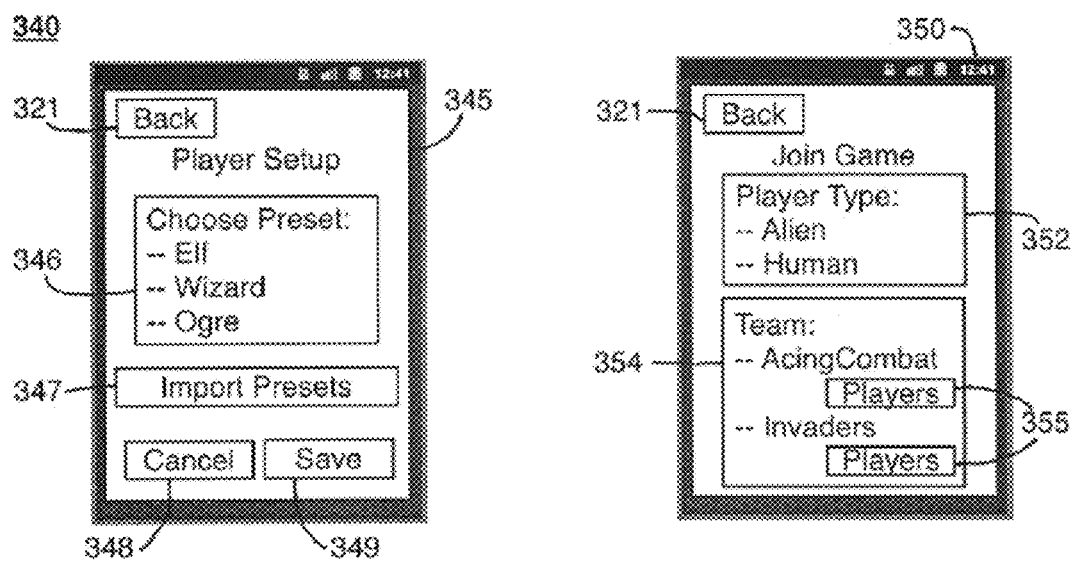
FIG. 3C shows a mobile graphical user interface (GUI) depicting a game support application.

FIG. 3C shows illustrations 340 of exemplary player setup and join game. Each of the presented GUIs may have a back button configured to return a user to the main menu or a previous sub menu depending on application structure. Player setup GUI 345 can present the user with a choose preset option 346 to select predetermined player profiles for a game, an import presets 347 button and the option to cancel 348 or save 349 a selection. Player setup options can be influenced by a player status as checked in or checked out of a game (with a player potentially only being shown player preset options for the current game, when checked in).

A join game GUI 350 may present a player with the option to select a player type 352 and view team display 354 with an option to view team players 355. Team players 355 can include information such as whether players have checked in or not, their player type, and the like. In one embodiment, GUI 350 may lead directly into a join option after player selections are complete or require a password for joining or any other type of authentication as would be understood by a person having ordinary skill in the art.

Figure 3D:
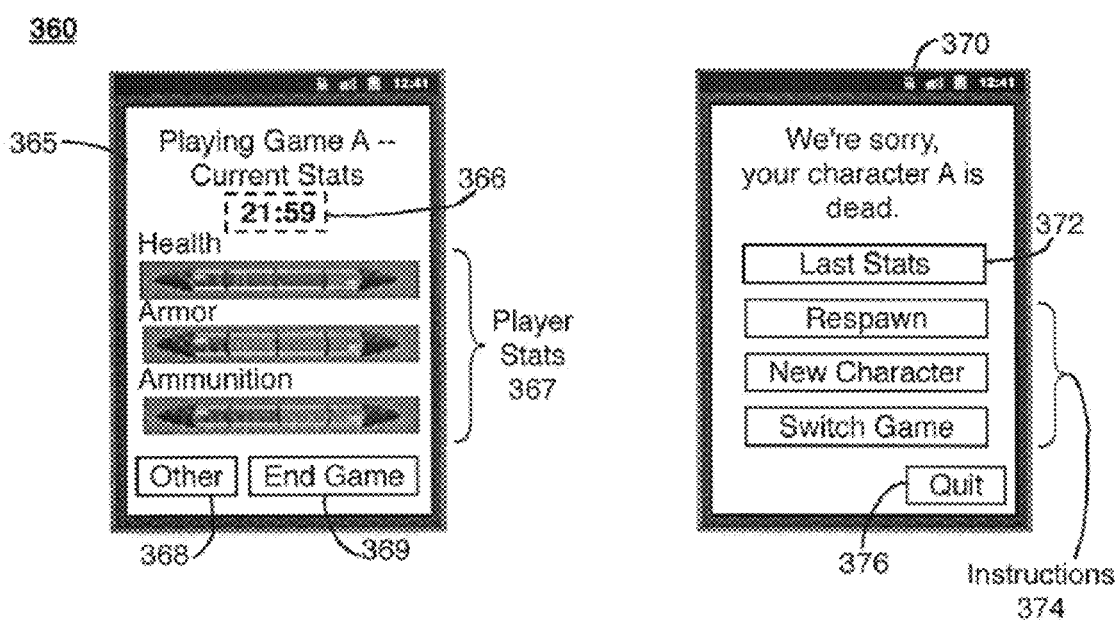
FIG. 3D shows a mobile graphical user interface (GUI) depicting a game support application.

FIG. 3D may show an example 360 of in-game GUIs for an interactive game support system. Playing game GUI 365 (alive and participating players) may present an individual player with a game count down timer 366, which can be customized to display elapsed time, time remaining, or both. Additionally, GUI 365 may display player statistics 367 in, for example graphical or numerical form, or a combination thereof. GUI 365 can also present the user with other 368 statistics options such as team statistics or overall game settings and rules, equipment status and the like. GUI 365 can also include an option to end a game 369. In the alternative to GUI 365, a player may be presented with a player expiration GUI 370 upon player expiration. GUI 370 can include selection such as viewing the player's last stats 372 and providing instructions 374 (for example, to re-spawn the character, rejoin the game as a new character, or switch game depending on current game setup) or quitting the current game 376.

It should be noted that the quantity of GUIs and their configuration may depend upon the design and implementation of the game support application. As such, components illustrated in FIGS. 3A through 3D are components of an exemplary embodiment of the game support application.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for interactive game support comprising:
   at least one game device communicatively coupled to at least one player-associated mobile device running a game support application thereon, wherein the game support application is configured to maintain player attributes and game play data derived from pre-defined customizable game settings, initial player attributes, and game device interactions,
   wherein player attributes comprise at least one of character type, health, and available game devices, and
   wherein game settings comprise at least one of game device effects on character types and playing field boundaries; and
   at least one command-control center server having a data store capable of maintaining user profile data which is communicatively coupled to at least one of the at least one mobile device or the at least one game device, and
   at least one network for communicatively coupling the at least one command-control center server with at least one of the at least one mobile device or the at least one game device,
   wherein the at least one mobile device further comprises at least one of a transmitter, receiver, transceiver, GPS, speaker, microphone, and data store,
   wherein the at least one game device is one of a weapon, protection device, or accessory and includes at least one sensor for monitoring interactions with at least one other game device, and
   wherein the at least one game device further comprises at least one of fiber optic filaments or layers of conductive fabrics and the at least one sensor monitors interactions between the fiber optic filaments of different game devices or between the conductive fabrics of the at least one game device.

2. The system of claim 1, wherein the at least one command-control center server is accessed through a webpage interface.

3. The system of claim 1, wherein game settings, player attributes, and device attributes are pre-set through a command-control center server.

4. The system of claim 1, wherein the at least one game device and the at least one mobile device are communicatively coupled by UHF radio waves, and more specifically Bluetooth.

5. The system of claim 1, wherein each of the at least one mobile device is associated with a unique player.

6. The system of claim 1, wherein the at least one mobile device is configured to establish playing field boundaries through its GPS capability.

7. The system of claim 1, wherein the speaker is configured to play sounds based on player attributes.

8. The system of claim 1, wherein the data store on the at least one mobile device stores game attribute data.

9. The system of claim 1, wherein the at least one game device further comprises at least one transmitter, receiver, or transceiver for communicating with the at least one mobile device or a command-center server.

10. The system of claim 1, wherein the at least one sensor consists of a fiber optic sensor.

11. The system of claim 1, wherein the at least one game device includes at least one transmitter for interacting with at least one other game device.

12. The system of claim 11, wherein the at least one transmitter consists of a fiber optic transmitter.

13. The system of claim 1, further comprising a marketplace through the game support application or command-control center server interface where users can collect, trade, upgrade, or purchase items through a points system or in game currency.

14. A method of supporting a live-action role playing game comprising:

providing at least one mobile device associated with a player, wherein the at least one mobile device further comprises at least one of a transmitter, receiver, transceiver, GPS, speaker, microphone, and data store;

running a game support application on the at least one mobile device;

establishing new customizable gameplay settings or selecting pre-set gameplay settings, wherein gameplay settings comprise at least one of game device effects on character types and playing field boundaries;

creating and hosting a game;

allowing at least one player to join the game;

determining or establishing a player's attributes, wherein player attributes comprise at least one of character type, health, and available game devices;

providing at least one game device communicatively coupled to the at least one mobile device wherein the at least one game device is one or more of a weapon, protection device, or accessory, and includes at least one sensor configured to interact with other game devices, wherein the at least one game device further comprises at least one of fiber optic filaments or layers of conductive fabrics and the at least one sensor monitors interactions between the fiber optic filaments of different game devices or between the conductive fabrics of the at least one game device;

monitoring interactions among game devices and mobile devices through the game support application; and updating game play data based on the interactions through the game support application;

wherein the game is hosted and the gameplay play settings are established through a command-control center server communicatively coupled with at least one of the at least one mobile device or the at least one game device.

15. The method of claim 14, wherein the game is hosted and the game play settings are established through the game support application.

16. The method of claim 14, further comprising establishing a playing field by using a mobile device's GPS to set boundaries through a game support application.

17. The method of claim 14, further comprising providing a spectator mode in the game support application for expired players to observe the continued gameplay, adjust player attributes, attempt to re-spawn, or leave the game.

18. The method of claim 14, further comprising awarding points to players and allowing players to collect, trade, upgrade, or purchase items with the points through the game support application or command-control center server interface.

* * * * *